United States Patent Office 3,573,054
Patented Mar. 30, 1971

3,573,054
PHOTOGRAPHIC PROCESS FOR PRODUCING A PLURALITY OF IMAGES ON PREDETERMINED AREAS OF A NON-SPECTRALLY SENSITIZED SILVER HALIDE LAYER BY SEQUENTIAL SPECTRAL SENSITIZING, EXPOSING, AND CHEMICAL DESENSITIZATION OF EACH AREA
John F. Tinker, Brockport, and Jean E. Jones, Rochester, N.Y., assignors to Eastman Kodak Company, Rochester, N.Y.
No Drawing. Filed May 2, 1968, Ser. No. 726,230
Int. Cl. G03c 1/36, 5/04
U.S. Cl. 96—101                    14 Claims

ABSTRACT OF THE DISCLOSURE

A photographic process in which a photographic element comprising a support coated with a non-spectrally sensitized silver halide layer is locally spectrally sensitized in one area to an exposing light, exposed to produce a latent image in the spectrally sensitized area, desensitized in the spectrally sensitized and exposed area, locally spectrally sensitized in a second area to an exposing light, and this sequence of steps repeated to produce latent images in other areas and finally photographically developing and fixing the exposed photographic element, is used to advantage to produce a plurality of photographic images in predetermined areas of the photographic element in such a way that latent images in the element are not affected by light exposure used to produce subsequent latent images.

---

This invention relates to a photographic element and to the use of such an element in a process for sequentially recording a series of light images on different areas of said element so that exposure to one area has no effect on unexposed or latent image bearing silver halide in immediately adjacent areas and then photographically developing the said latent images.

For various purposes it is desired to make a plurality of photographic images on a photographic element. In the graphic arts for example "paste-ups" comprising a composite of pictures, graphs, maps, etc., are made by pasting the various parts of the composite picture on a common support and then photographically copying this as the next step in making a printing plate. Photographic materials and processes are desired to eliminate the need for making the "paste-up." Another example is in character recognition systems using fiber optics to conduct a light image from an input plane to an output plane for which masks are needed for each character that is to be recognized. The various masks are advantageously made on a common support. The assemblies of optical fibers (for example, glass fibers) are in fiber "bundles" in which the fibers are either precisely aligned so that the relationship of each fiber is the same at the input and output planes so the output plane image is essentially the same as the input plane, or the fibers are aligned so that their arrangement in the input and output planes is not the same and the fiber bundle splits the image into a pattern of light spots. For character recognition it is desired to produce for each character to be recognized at the input of an optical fiber bundle, a separate mask which when placed over the output plane of the optical fiber bundle will either transmit an amount of light below a certain limiting value (when mask is a negative) or transmit an amount of light above a certain limiting value (when mask is a positive). It is advantageous to have the various masks on different areas of a piece of photographic film.

The production of masks suitable for use in fiber optic systems can be accomplished photographically by means of a photographic silver halide layer. However, it is necessary that the silver halide layer, that is held over the output plane of the fiber bundle, be capable of being sensitized only in one area to the light which is passed by a given character. After exposure, it is necessary that the exposed area be made insensitive. Thus, when the next character is placed in the input plane, the light passed by it will not affect the already exposed area, but only another area which has been sensitized to the light.

It is an object of the invention to provide a novel method of repeatedly spectrally sensitizing, exposing and desensitizing non-spectrally sensitized silver halide elements at various local areas of the element without significantly affecting the developability of the entire element.

It is another object of the invention to provide a novel method for the production of a plurality of image reproductions that are suitable for use in a fiber optic system.

It is still another object of the invention to provide a novel process for making masks used to advantage in a character recognition system using fiber optics.

A still further object of the invention is to provide a novel photographic element carrying a plurality of photographic masks thereon at predetermined areas.

These and other objects of the invention are accomplished by producing at least one photographic image on a non-spectrally sensitized silver halide layer by the method which comprises spectrally sensitizing a portion of the layer, exposing the spectrally sensitized portion of the layer, desensitizing the exposed portion of the layer, and photographically developing and fixing the image.

In accordance with the present invention a non-spectrally sensitized photographic silver halide layer is spectrally sensitized at a predetermined area of the layer by application thereto of a spectral sensitizing agent. The silver halide layer is exposed to a light imgae and then a desensitizing agent is applied to the latent image containing sensitized area. This treatment prevents the silver halide from further responding to an exposure by light absorbed by the spectral sensitizer. In this manner adjoining areas of the silver halide layer are spectrally sensitized, exposed and desensitized employing the same sequence without affecting the previously exposed areas of the silver halide layer. Finally, the entire silver halide layer is developed at one time to form a photographic element comprising a series of different masks with each mask occupying a predetermined portion of the silver halide layer.

The photographic element of the present invention is produced by employing, for example, any non-spectrally sensitized light-sensitive developing-out silver halide layer. Any silver halide, such as silver bromide, silver chloride, silver iodide, silver chlorobromide, silver bromoiodide, silver chlorobromoiodide, and the like is used. The silver halide is advantageously used in emulsions including those described by Trivelli and Smith, Photo. Journal, 79, 330 (1939), the disclosure of which is hereby incorporated by reference.

Evaporated silver halide layers can also be employed for the production of the photographic elements of the present invention. Such layers are formed without the usual colloidal vehicle, for example, by vapor deposition in high vacuum of one or a mixture of silver halides onto a transparent support, such as plastic, film or glass, and the like. Highly suitable evaporated silver halide layers for employment in the method of the present invention are prepared, for example, according to the methods described in U.S. Pat. 3,316,096 and U.S. Pat. 3,335,009 to Rasch and Hodges, which are hereby incorporated by reference.

Any suitable sensitizing agent is employed in the process of the present invention for the spectral sensitization of a local area of the non-spectrally sensitized silver hailde layer. Thus various dyes, including cyanines, merocyanines, and the like, which dyes are well known in the art to act as spectral sensitizers are employed.

The preferred sensitizing dyes are those which are soluble in water or polar solvent, e.g., alcohols, and include dyes such as the cyanine and merocyanine dyes described in the following patents: Brooker U.S. Pat. 1,846,-301, issued Feb. 23, 1932; 1,846,302, issued Feb. 23, 1932; and 1,942,854, issued Jan. 9, 1934; White U.S. Pat. 1,990,507, issued Feb. 12, 1935; Brooker and White U.S. Pats. 2,112,140, issued Mar. 22, 1938; 2,165338, issued, July 11, 1939; 2,493,747, issued Jan. 10, 1950; and 2,739,694, issued Mar. 27, 1956; Brooker and Keyes U.S. Pat. 2,493,748, issued Jan. 10, 1950; Sprague U.S. Pats. 2,503,776, issued Apr. 11, 1950 and 2,519,001, issued Aug. 15, 1960; Heseltine and Brooker U.S. Pat. 2,666,-761, issued Jan. 19, 1954; Heseltine U.S. Pat. 2,734,900, issued Feb. 14, 1956; Van Lare U.S. Pat. 2,739,149, issued Mar. 20, 1956, and Kodak Limited British Pat. 450,958, accepted July 15, 1936.

Especially preferred sensitizing agents are the dyes that are water soluble due to the presence of sulfo groups, sulfoalkyl groups, sulfoaryl, carboxy groups, carboxyalkyl groups, sulfocarboxyalkyl groups, dialkylaminoalkyl groups and similar solubilizing groups. Exemplary of the preferred sensitizing dyes which are useful in the present invention is the class of cyanine dyes represented by the formula:

(I) 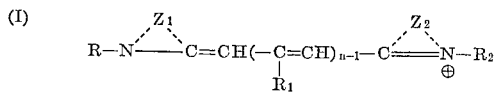

and the merocyanine dyes represented by the formula:

(II) 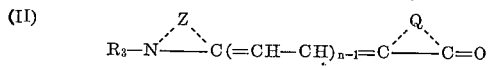

in which R, $R_2$ and $R_3$ each represents a lower alkyl group such as methyl, ethyl, propyl, isopropyl, butyl, secondary butyl, tertiary butyl, etc., and including substituted alkyl groups such as sulfoalkyl groups in which the alkyl group has from 1 to 4 carbon atoms, such as sulfomethyl, sulfoethyl, sulfopropyl, sulfobutyl, etc., and carboxyalkyl groups in which the alkyl group has from 1 to 4 carbon atoms such as carboxymethyl, carboxyethyl, carboxypropyl, carboxybutyl, etc., hydroxyalkyl in which the alkyl group has from 1 to 4 carbon atoms, such as, hydroxymethyl, hydroxyethyl, etc.; $R_1$ represents a hydrogen atom or a lower alkyl group such as methyl, ethyl, propyl, butyl, etc.; $n$ is an integer of from 1 to 3; Z, $Z_1$ and $Z_2$ each represents the nonmetallic atoms required to complete a 5- to 6-membered basic heterocyclic nucleus containing as the hetero atoms nitrogen, sulfur, oxygen, selenium, etc., with at least one nitrogen atom, and especially heterocyclic nuclei such as a thiazole (e.g., thiazole, 4-methylthiazole, 4-phenylthiazole, 5-methylthiazole, 5-p-sulfophenylthiazole, 4,5-dimethylthiazole, 4,5-diphenylthiazole, 4-(2-thienyl)thiazole, etc.), a benzothiazole (e.g., benzothiazole, 4-chlorobenzothiazole, 5-sulfobenzothiazole, 6-sulfobenzothiazole, 7-sulfobenzothiazole, 4-methylbenzothiazole, 5-methylbenzothiazole, 6-methylbenzothiazole, 5 - bromobenzothiazole, 6 - bromobenzothiazole, 4-phenylbenzothiazole, 5-phenylbenzothiazole, 4 - methoxybenzothiazole, 5 - methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5, 6-dioxymethylenebenzothiazole, 5-hydroxybenzothiazole, 6-hydroxybenzothiazole, etc.), a naphthothiazole (e.g., α-naphthothiazole, β-naphthothiazole, 5-methoxy-β-naphthothiazole, 5 - sulfo - β - naphthothiazole, 8-methoxy-α-naphthothiazole, 7-methoxy-α-naphthothiazole, etc.), a thionaphtheno - 7′,6′,4,5 - thiazole (e.g., 4′-methoxythianaphtheno-7′,6′,4,5-thiazole, etc.), an oxazole (e.g., 4-methyloxazole, 5-methyloxazole, 4-p-sulfophenyloxazole, 4,5 - diphenyloxazole, 4 - ethyloxazole, 4,5 - dimethyloxazole, 5 - phenyloxazole, etc.), a benzoxazole (e.g., benzoxazole, 5 - chlorobenzoxazle, 5 - methylbenzoxazole, 5 - carboxybenzoxazole, 6 - sulfobenzoxazole, 5,6 - dimethylbenzoxazole, 4,6 - dimethylbenzoxazole, 5-methoxybenzoxazole, 5 - ethoxybenzoxazole, 5 - chlorobenzoxazole, 6 - methoxybenzoxazole, 5 - hydroxybenzoxazole, 6-hydroxybenzoxazole, etc.), a naphthoxazole (e.g., α-naphthoxazole, β-naphthoxazole, etc.), a selenazole (e.g., 4-methylselenazole, 4-p-sulfophenylselenazole, etc.), a benzoselenazole (e.g., benzoselenazole, 5-chlorobenzoselenazole, 5-methoxybenzoselenazole, 5-hydroxybenzoselenazole, tetrahydrobenzoselenazole, etc.), a naphthoselenazole (e.g., α-naphthoselenazole, β-naphthoselenazole, etc.), a thiazoline (e.g., thiazoline, 4-methylthiazoline, etc.), a 2-pyridine (e.g., 2-pyridine, 5-methyl-2-pyridine, etc.), a 4-pyridine (e.g., 4-pyridine, 3-methyl-4-pyridine, etc.), a 2-quinoline (e.g., 2-quinoline, 3 - methyl - 2 - quinoline, 5 - ethyl-2-quinoline, 6-sulfo-2-quinoline, 8-chloro-2-quinoline, 6-methoxy-2-quinoline, 8-ethoxy-2-quinoline, 8-hydroxy-2-quinoline, etc.), a 4-quinoline (e.g., 4-quinoline, 6-methoxy-4-quinoline, 7-methyl-4-quinoline, 8-sulfo-4-quinoline, etc.), a 1-isoquinoline (e.g., 1-isoquinoline, 3,4-dihydro-1-isoquinoline, etc.), a 3-isoquinoline (e.g., 3-isoquinoline, etc.), a 3,3-dialkylindolenine (e.g., 3,3-dimethylindolenine, 3,3,5-trimethylindolenine, 3,3,7 - trimethylindolenine, etc.), an imidazole (e.g., imidazole, 1-alkylimidazole, 1-alkyl-4-phenylimidazole, 1-alkyl-4,5-dimethylimidazole, etc.), a benzimidazole (e.g., benzimidazole, 1-alkylbenzimidazole, 1-aryl-5,6-dichlorobenzimidazole, etc.), a naphthimidazole (e.g., 1 - alkyl - α - naphthimidazole, 1-aryl-β-naphthimidazole, 1-alkyl-5-methoxy-β-naphthimidazole, etc.), etc.; such that Z has a sulfo group or a carboxy group, and such that at least one of $Z_1$ and $Z_2$ has a sulfo group or a carboxy group; and Q represents any acidic cyclic nucleus used as a terminal nucleus of a merocyanine dye including a 4- to 6-membered ketomethylene cyclic nucleus, particularly heterocyclic nuclei such as, a 3-thietanone-1,1-dioxide (e.g., 3 - thietanone - 1,1 - dioxide, 2-methyl-3-thietanone - 1,1 - dioxide, 2,2-dimethyl-3-thietanone-1,1-dioxide, 2,2-dipropyl-3-thietanone-1,1-dioxide, etc.), a rhodanine (e.g., rhodanine, 3-ethylrhodanine, 3-sulfobutylrhodanine, 3-carboxyethylrhodanine, 3-phenylrhodanine, 3-carboxyphenylrhodanine, 3-(N,N-diethylaminoethyl)-rhodanine, etc.), a 2-thiobarbituric acid nucleus (e.g., 2-thiobarbituric acid, 3-ethyl-2-thiobarbituric acid, 3 - sulfobutyl - 2 - thiobarbituric acid, 1,3-diethyl-2-thiobarbituric acid, 3-phenyl-2-thiobarbituric acid, 1-ethyl-2-thiobarbituric acid, 1,3-disulfophenyl-2-thiobarbituric acid, etc.), a barbituric acid (e.g., barbituric acid, ethylbarbituric acid, 3-sulfobutylbarbituric acid, 1,3-diethylbarbituric acid, 1-ethyl-3-(2-morpholinoethyl)barbituric acid, 1-ethyl-3-phenylbarbituric acid, 1,3-disulfophenylbarbituric acid, etc.), a 2-thiohydantoin nucleus (e.g., 2-thiohydantoin, 3-ethyl-2-thiohydantoin, 1-(2-diethylaminoethyl-3-ethyl-2-thiohydantoin, 3-carboxyethyl-2 - thiohydantoin, 3-phenyl - 1 - sulfobutyl - 2 - thiohydantoin, etc.), a hydantoin nucleus (e.g., hydantoin, 3-ethylhydantoin, 3-sulfobutylhydantoin, 3-ethyl-1-phenylhydantoin, 1 - ethyl - 3 - sulfophenylhydantoin, 3-tolylhydantoin, etc.), a 2-thio-2,4-oxazolidinedione nucleus (e.g., 2-thio-2,4-oxazolidinedione, 3-ethyl-2-thio-2,4-oxazolidinedione, 3-butyl-2-thio-2,4-oxazolidinedione, 3-sulfobutyl - 2 - thio - 2,4-oxazolidinedione, 3-phenyl-2-thio-2,4 - oxazolidinedione, 3 - sulfophenyl - 2 - thio - 2,4-oxazolidinedione, etc.), a 2-thiazolin-4-one nucleus (e.g., 2 - thiazolin - 4 - one, 2-diphenylamino-2-thiazolin-4-one, diethylamino - 2 - thiazolin-4-one, 2(N-ethyl-N-phenylamino) - 2 - thiazolin - 4 - one, etc.), a 2-pyrazolin-5-one nucleus (e.g., 2 - pyrazolin - 5 - one, 3-methyl-1-p-sulfophenyl - 2 - pyrazolin-5-one, 3-p-sulfophenyl-1-methyl-2-pyrazolin-5-one, 1-chlorophenyl-3-phenylcarbonamino-2-pyrazolin-5-one, etc.), a 2-imidazolin-4-one nucleus (e.g., 3-ethyl-1-phenyl-2-thioxoimidazolin-4-one, 1,3-dibutyl-2-thioxoimidazolin - 4 - one, 1-methyl-3-phenyl-2-thioxo-imidazolin-4-one, etc.), a 2-imidazolin-4-thione nucleus (e.g., 3-ethyl-1-phenyl-2-thioxoimidazolin-4-thione, 1,3-diethyl-2-thioxoimidazolin-4-thione, etc.), a 2-imidazolin-4 - selenone nucleus (e.g., 3 - ethyl - 1 - phenyl-2-thioxoimidazolin - 4 - selenone, 1,3-diethyl-2-thioxoimidazolin-4-selenone, etc.), and a carbocyanic ring, particularly containing from 4- to 6-atoms in the ring, such as, a 1,3-cyclopentanedione (e.g., 1,3-cyclopentanedione, 2-methyl-1,4 - cyclopentanedione, etc.), a 1,3 - cyclohexanedione nucleus (e.g., 1,3-cyclohexanedione, 5-methyl-1,3-cyclohexanedione, etc.). The preferred dyes of Formula II have a solubilizing group that contains such groups as sulfo, carboxy, or dialkylaminoalkyl on the Q group.

Sensitizing agents having the foregoing Formulas I and II are, for example:

Anhydro-9-ethyl-3,3'-dimethyl-4,5,4',5'-dibenzothiacarbocyanine hydroxide, disulfonated
Anhydro-5'-chloro-9-ethyl-3-methyl-3'-(3-sulfobutyl)-4,5-benzothiacarbocyanine hydroxide, monosulfonated
Anhydro-5'-chloro-9-ethyl-3-methyl-3'-(3-sulfobutyl)-4,5-benzoselenacarbocyanine hydroxide, monosulfonated
4-[4-(3-ethyl-2(3H)-benzoxazolylidene)-2-butenylidene]-3-methyl-1-p-sulfophenyl-2-pyrazolin-5-one, monosulfonated
4-[(3-ethyl-2(3H)-benzoxazolylidene)ethylidene]-3-methyl-1-p-sulfophenyl-2-pyrazolin-5-one, monosulfonated
Anhydro-3,3'9-triethyl-5,5'-di(p-sulfophenyl)-oxacarbocyanine hydroxide
Anhydro-3,3'-di-(3-sulfobutyl)-9-methylthiacarbocyanine hydroxide
Anhydro-5'-chloro-9-ethyl-3-methyl-3'-(carboxymethyl)-4,5-benzothiacarbocyanine hydroxide, monosulfonated Still further examples of water-soluble sensitizing agents suitable for employment in the present invention are the following dyes:

Anhydro-3-ethyl-3'-beta-(4-sulfobutoxy)ethylthiacarbocyanine hydroxide
Anhydro-1'-ethyl-3-beta-(3-sulfopropoxy)ethylthia-2'-cyanine hydroxide
Anhydro-1'-ethyl-3-beta-(sulfobutoxy)ethylthia-2'-cyanine hydroxide
3-(2-diethylaminoethyl)-5-[ethylnaphtho-[1,2-d]-thiazolin-2-ylidene)-1-phenylethylidene]rhodanine
3-(2-diethylaminoethyl)-5-(1-ethyl-4((1H)pyridylidene)-rhodanine
1-(2-diethylaminoethyl)-3-ethyl-5-[(3-ethyl-2-benzothiazolinylidene)-ethylidene]-2-thiohydantoin
1-ethyl-5-[(3-ethyl-2-benzothiazolinylidene)-ethylidene]-3-(2-morpholinoethyl)-barbituric acid
1-ethyl-5-[(3-ethyl-2-benzothiazolinylidene)-ethylidene]-3-(2-morpholinoethyl)-2-thiobarbituric acid
3-(3-dimethylaminopropyl)-5-(1-methyl-2(1H)-quinolylidene)-rhodanine
2-[(benzothiazolyl-ethoperchlorate)methylene]-3-(3-dimethylaminopropyl)-5-[(1-methylnaphtho-[1,2-d]-thiazolin-2-ylidene)-1-phenylethylidene]-4-thiazolidinone
1-(2-diethylaminoethyl)-5-[(1-ethylnaphtho-[1,2-d]-thiazolin-2-ylidene)-(1-methylnaphtho-[1,2-d]-thiazolin-2-ylidene)-isopropylidene]-3-phenyl-2-thiobarbituric acid The foregoing sensitizing dyes may be prepared according to the methods described in the following patents, which also disclose additional sensitizers suitable for use in the present invention. The disclosures of the following patents are hereby incorporated by reference:

Heseltine, U.S. Pat. 3,148,187, granted Sept. 8, 1964
Brooker et al., French Pat. 1,359,761, issued Mar. 23, 1964
Taber et al., French Pat. 1,444,772, issued May 31, 1966
Taber et al., French Pat. 1,445,548, issued June 5, 1966
Taber et al., French Pat. 1,450,521, issued July 18, 1966

The spectral sensitizing agent is applied to the silver halide layer in any of a wide range of concentrations. Thus, suitable amounts include from about 10 milligrams of the sensitizing agent per liter of solvent used to the limit of solubility of the agent in the solvent, e.g., water or lower alcohol.

The spectral sensitizing agent is applied to a predetermined area of the non-spectrally sensitized silver halide layer in any suitable manner. Thus, the spectral sensitizing agent is applied to the silver halide layer by means of a felt pad, a preformed web, a controlled spray means, etc. The spectral sensitizer is applied to the silver halide over a wide range of conditions. However, ambient temperatures and pressures are suitably employed and are preferred particularly in view of the ease of operation. Likewise, contact times for applying the spectral sensitizer are varied to a great extent. A contact time of over 30 seconds is preferred when the silver halide is present in the form of an emulsion. However, if an evaporated silver halide layer is employed, the layer can be contacted with the spectral sensitizing agent for as little as, for example, two seconds. The most desirable conditions are easily determined, experimentally, and will depend upon the particular spectral sensitizing agent, the concentration utilized and the nature of the silver halide layer employed.

The photographic element now having a portion thereof spectrally sensitized is now photographically exposed with the result that a latent image is formed on the sensitized portion. Image exposure is advantageously made employing light which will only record in the local spectrally sensitized areas. Obviously, the remaining non-spectrally sensitized area of the silver halide layer is insensitive to the light employed for exposure.

The exposed, spectrally sensitized portion of the silver halide layer is now desensitized by means of a desensitizing agent so that the silver halide will not respond to the light absorbed by the spectral sensitizer.

Suitable desensitizing agents that are applied to the area of the silver halide layer which has been spectrally sensitized and exposed include heavy metal salts, such as mercury salts, rhodium salts, etc. Other desensitizers which are used comprise heterocyclic compounds containing at least one hetero sulfur and/or nitrogen atom. Heterocyclic desensitizers containing at least one benzene ring and desirably containing at least one nitro substituent attached to the benzene ring, are especially useful. Typical of such organic desensitizers are benzotriazole compounds containing a nitro substituent on the benzene ring of the benzotriazole nucleus, e.g., 5-ntirobenzo-1,2,3-triazole, 4-nitrobenzo-1,2,3-triazole, etc., (including their halogen substituted derivatives, such as 5-chloro-, 6-chloro-, etc.).

Non-heterocyclic aromatic desensitizers containing at least one nitro substituent such as 3,5-dinitrobenzhydrazide and the like are also useful. Another group of desensitizers comprise a class of dyes known as styryl dyes which contain at least one nitro substituent attached to a benzene ring. Other desensitizers include anil and safranine dyes. Anthraquinone dyes containing a sulfalkylaminosulfone radical can also be used to desensitize photographic silver halide emulsions useful in practicing the invention.

The following compounds are representative of desensitizers which are useful in treating the photographic silver halide layers of the present invention:

Mercuric chloride
Triammonium hexachlorhodite
3,5-dinitrobenzhydrazide
5-nitrobenzo-1,2,3-triazole
4-nitro-6-chlorobenzotriazole
2,3-dimethyl-6-nitrobenzothiazolium-p-toluenesulfonate 2-phenylbenzo-1,2,3-thiadiazolium bromide
N,N'-decamethylene-bis(quinoxalinium)perchlorate
Methylene blue chloride
1-methyl-2-(p-nitrostyryl)-6-ethoxyquinolinium-p-toluenesulfonate
2-(p-diethylaminophenyliminomethyl)-1,6-dimethyl-quinolinium chloride
2-(p-dimethylaminophenyliminomethyl)-3-ethylbenzothiazolium ethosulfate
Phenosafranine (chloride)
Pinakryptol green (chloride)
1,3-diamino-5-methylphenazinium chloride
3-methyl-2-bis-(phenylazo)-methylene benzothiazoline
Anthraquinone-2-sulphotauride Patents which describe photographic silver halide desensitizers useful in treating the silver halide layers of the invention include the following, for example.

Schuloff, U.S. Pat. 1,653,314, granted Dec. 20, 1927
Homolka, U.S. Pat. 1,760,756, granted May 27, 1930
Muller et al., U.S. Pat. 2,196,162, granted Apr. 2, 1960
Kendall et al., U.S. Pat. 2,541,472, granted Feb. 13, 1951
Kendall et al., U.S. Pat. 2,669,515, granted Feb. 16, 1954
Horwitz, U.S. Pat. 2,794,802, granted June 4, 1957
Stewart et al., U.S. Pat. 3,250,618, granted May 10, 1966
Groves, British 465,343, accepted Apr. 30, 1937
Compagnie, French 1,049,896, issued Aug. 26, 1953, and addition 64,756, issued June 29, 1955
Compagnie, French 1,092,537, issued Nov. 10, 1954.

The 2-phenylbenzo-1,2,3-thiadiazolium bromide, supra, can be prepared according to the method described by A. Burowoy, A. Chaudhuri and C. E. Vellins in "Journal Chemical Society" (London), page 90 (1956). The 2-(p-diethylaminophenyliminomethyl) - 1,6 - dimethylquinolinium chloride is described by Mees, "The Theory of the Photographic Process," first edition (MacMillan), page 1043 (page 422 of second edition), and by Kendall et al. British Pat. 447,109, accepted May 4, 1936. The desensitizer, 3 - methyl-2-bis-((phenylazo)methylene benzothiazoline may be prepared as described in French Pat. 1,049,-896.

Especially useful desensitizers which are described in several of the afore-mentioned patents include the cyclammonium quaternary salts represented by the following general formula:

(A)

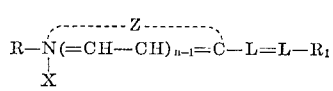

wherein R represents an alcohol radical, i.e., a substituted or unsubstituted alkyl group, such as methyl, ethyl, propyl, butyl, ethoxycarbonylmethyl, β-hydroxyethyl, etc., $R_1$ represents an aryl group, such as phenyl, or phenyl substituted by common organic radicals, such as hydroxyl nitro, amino, alkylamino, dialkylamino, methyl, ethyl, ethoxyl, methoxyl, etc., L-represents a methine group, i.e., a —CR'- group where R' represents a hydrogen atom or an alkyl group, such as methyl, ethyl, etc., X represents an acid radical, such as chloride, bromide, iodide, perchlorate, benzenesulfonate, p-toluenesulfonate, methylsulfate, ethylsulfate, etc., n represents a positive integer of from 1 to 2, and Z represents the nonmetallic atoms necessary to complete a heterocyclic nucleus containing at least one nitrogen atom and from 5 to 6 atoms in the heterocyclic ring, such nuclei being well known to those skilled in the art.

It is to be understood that the styryl dyes embraced by Formula A above contain at least one benzene nucleus to which is attached at least one nitro group. Typical nuclei defined by Z include benzothiazole, quninoline, benzoxazole, indolenine, etc., which can contain simple substituents on the benzene ring thereof, such as, methyl, ethyl, methoxy, ethoxy, hydroxyl, amino, etc.

The desensitizing agent is preferably applied locally, i.e., to the area of the silver halide layer to which the spectral sensitizer had been applied, by means of a suitable applicator means, e.g., a felt pad, preformed web, etc.

Any suitable amount of desensitizer is employed. The concentration used will depend upon the nature of the silver halide layer, the type of desensitizer and various other factors. However, the amount of desensitizer employed must be that sufficient to result in a silver halide layer having a sensitivity low enough so that the exposure of the final local area that is sensitized will yield recognizable differences in density over the entire element. This concentration can be easily determined experimentally with the particular silver halide coating and desensitizing agent employed, and is well within the skill of the art.

As previously mentioned a non-spectrally sensitized silver halide layer is employed to form the photographic element of the present invention. However, the silver halide emulsion layer can be chemically sensitized by any of the accepted procedures. Other conventional silver halide emulsion addenda can be also be utilized such as antifoggants, gelatin hardeners, gelatin plasticizers, etc. Where it is desired to produce a dye and silver image in our photographic process, a nondiffusing color-forming coupler, such as is used in color photographic materials is advantageously incorporated in the photographic emulsion by any of the well known methods, such as are described by Martinez U.S. Pat. 2,284,877, Jelley and Vittum U.S. Pat. 2,322,027, Fierke U.S. Pat. 2,801,107, Fierke et al. U.S. Pat. 2,801,171, etc., or by Fischer incorporating technique. Usually a phenolic or a naphtholic coupler is used to produce a cyan dye image, a 5-pyrazolone coupler is used to form a magenta dye image and an open chain ketomethylene type coupler is used to form a yellow dye. Thousands of these couplers are described in color photographic art including representative examples mentioned in the above references.

In the preparation of the silver halide dispersions employed by preparing silver halide emulsions, there is employed as the dispersing agent for the silver halide in its preparation, gelatin or some other hydrophilic colloidal derivative, or a hydrophilic synthetic resin, for instance, a polyvinyl compound. Some colloids which are used are polyvinyl alcohol or a hydrolyzed polyvinyl acetate as described in Lowe U.S. Pat. 2,286,215, issued June 16, 1942; a far hydrolyzed cellulose ester such as cellulose acetate hydrolyzed to an acetyl content of 19–26% as described in U.S. Pat. 2,327,808 of Lowe and Clark, issued Aug. 24, 1943; a water-soluble ethanolamine cellulose acetate as described in Yutzy U.S. Pat. 2,322,085, issued June 15, 1943; a polyacrylamide or an imidized polyacrylamide as described in Lowe, Minsk and Kenyon U.S. Pat. 2,541,474, issued Feb. 13, 1951; zein as described in Lowe U.S. Pat. 2,563,791, issued Aug. 7, 1951; a vinyl alcohol polymer containing urethane carboxylic acid groups of the type described in Unruh and Smith U.S. Pat. 2,768,154, issued Oct. 23, 1956; or containing cyanoacetyl groups such as the vinyl alcohol-vinyl cyanoacetate copolymer as described in Unruh, Smith and Priest U.S. Pat. 2,808,331, issued Oct. 1, 1957; or a polymeric material which results from polymerizing a protein or a saturated acylated protein with a monomer having a vinyl group as described in U.S. Pat. 2,852,382, of Illingsworth, Dann and Gates, issued Sept. 16, 1958.

The locally spectrally sensitized area of our photographic element is advantageously exposed to a light image by any of the methods used in photography, i.e., contact printing in which a transparency bearing the desired image is held in contact with the resensitized area of our element while light is passed through the transparency to our element, projection printing in which a transparency is projected onto the resensitized area of our element, exposure in a camera, etc. In addition to these conventional methods, a particular advantageous method of exposure is by positioning the spectrally sensitized area of our photographic element over the output plane of a bundle of optical fibers used to conduct a light image from the input plane of the bundle of optical fibers. Any suitable light source is advantageously used for making the exposure. The selection of the optimum light source and exposure will depend upon the particular element used, the effects desired, etc., and can be easily determined by methods well known in the art.

Any of the conventional photographic developer solutions used for developing-out silver halide layers used to advantage in our process. Any of the conventional developing agents, e.g., a polyhydroxybenzene compound (e.g., hydroquinone, hydroquinone derivatives, catechol, pyrogallol, etc.), a 3-pyrazolidone (e.g., 1-phenyl-3-pyrazolidone, 1-tolyl-3-pyrazolidone, 4-methyl-1-phenyl-3-pyrazolidone, 4,4-dimethyl-1-phenyl-3-pyrazolidone, etc.), an aminophenol( e.g., N-methyl-p-aminophenol, p-β-hydroxyethylaminophenol, p-α-aminoethylaminophenol, 2,4-diaminophenol, etc.), a p-phenylenediamine (e.g., p-phenylenediamine, diethyl - p - phenylenediamine, methyl-p-phenylenediamine, 2-amino-5-diethylaminotoluene, 4-[N-ethyl-N-(β-hydroxyethyl)amino]aniline, etc.), etc., are used to advantage. With the exception of 2,4-diaminophenol which develops exposed silver halide even in acid solution, the developing agents singly or in combinations are used in alkaline solution. Any of the addenda used in developer solutions including alkali metal sulfite, alkali metal bromide, alkali metal thiocyanate, etc., are used to advantage in our solutions. The above developer solutions produce a silver image in exposed silver halide. In instances where it is desired to form a dye image, a primary aromatic amine color developing agent such as is illustrated by the p-phenylenediamine developers above is used in the developer solution along with a diffusible color-forming coupler such as is used in color photographic developer solutions (providing a nondiffusing coupler is not incorporated in the emulsion layer). For example, a phenolic or naphtholic coupler is used to produce a cyan dye image, a 5-pyrazolone coupler is used to produce a magenta dye image and an open-chain ketomethylene coupler such as an acetoacetanilide coupler is used to produce a yellow dye image.

The following examples are included for a further understanding of our invention.

EXAMPLES 1–5

A cellulose acetate film support is coated with a non-spectrally sensitized coating of a low speed gelatino silver bromoiodide emulsion of the type described by Trivelli and Smith in the Photo. Journal, vol. 79, (1939), beginning on page 330. Next, a piece of felt that is approximately one inch square is saturated with a solution containing the spectral sensitizer, anhydro-3,3'-di-3-sulfobutyl-9-methyl-thiacarbocyanine hydroxide, in the amount of 0.5 gram of sensitizer per liter of water. Also the solution contains a small amount of saponin. The felt is pressed into contact with the surface of the silver halide layer thereby sensitizing an area (A). A second area (B) is then sensitized with the spectral sensitizing dye in the same manner and the film is flashed to light transmitted by a red-colored filter, i.e., a Kodak Wratten filter #25. After exposure, the area (B) is contacted with a one square inch piece of felt that is saturated with a solution containing a small amount of saponin and the desensitizing agent, Pinakryptol green, in the amount of 0.18 gram of desensitizer per liter of aqueous solution. The area (A) is not contacted with the desensitizer. A third area (C) is then spectrally sensitized with the aforesaid sensitizing dye, the film flashed and then desensitized in the same manner as area (B). A fourth area (D) is then sensitized and exposed in the same manner, but is not desensitized. The entire emulsion-coated film is then processed for a period of three minutes in a developer solution having the following composition:

TABLE 1

| Ingredient | Amount, grams |
|---|---|
| p-Methylaminophenyl sulfate | 2 |
| Sodium sulfite, desiccated | 90 |
| Hydroquinone | 8 |
| Sodium carbonate, monohydrate | 52.5 |
| Potassium bromide | 5 |
| Water to make 1 l. | |

The film is then fixed in the solution described in Table 2, below, washed and dried.

TABLE 2

| Ingredient: | | Amount |
|---|---|---|
| Sodium thiosulfate | g | 240 |
| Sodium sulfite, desiccated | g | 15 |
| Acetic acid, 28% | ml | 48 |
| Boric acid crystals | g | 7.5 |
| Potassium alum | g | 15 |
| Water to make 1 l. | | |

The photographic densities of the various areas are set forth below in Table 3:

TABLE 3

| Example No.: | Area | Density |
|---|---|---|
| 1 | A | 2.2 |
| 2 | B | 1.7 |
| 3 | C | 1.6 |
| 4 | D | 1.6 |
| 5 | Fog | 0.1 |

The results set forth in Table 3 illustrate that the area (A) that is not desensitized by the Pinakryptol green responds to subsequent exposures and builds up more developable density. On the other hand, the Areas (B) and (C) that are desensitized by the desensitizing agent prior to subsequent exposures do not build up additional developable density.

EXAMPLES 6–7

A non-spectrally sensitized emulsion identical to that employed in the previous examples is coated on a cellulose acetate support and is contacted with the anhydro-3,3'-di-3-sulfobutyl-9-methyl-thiacarbocyanine hydroxide sensitizing dye in the same manner as before at an Area (E), but is then treated with the Pinakryptol green desensitizing agent before any exposure. Next, another area (F) is treated with the same sensitizing dye, but is not desensitized prior to exposure. The film is then subjected to repeated exposures as before, and is processed, fixed, washed and dried as in the previous examples. The photographic densities of the areas are measured and the following results are obtained:

TABLE 4

| Example No.: | Area | Density |
|---|---|---|
| 6 | E | 0.12 |
| 7 | F | 2.4 |

The results set forth in Table 4 illustrate that the sensitization conferred by the spectral sensitizer is eliminated by the desensitizing agent. The action of the desensitizer prevents the build-up of any developable density above fog, i.e., 0.12. On the other hand, the area (F) that is sensitized, but not subsequently desensitized before exposure builds up more developable density.

EXAMPLES 8–19

A cellulose acetate film support is coated with a non-spectrally sensitized silver chlorobromide emulsion. Next, twelve different one square inch areas of the emulsion are each, in turn, treated with a spectral sensitizing dye; exposed to form a latent image using light that will record only in the local spectrally sensitized area; and desensitized. The desensitizing agent employed in each of the areas is 4-nitro-6-chlorobenzotriazole. However, each of the spectral sensitizing dyes set forth in Table 5, below, is employed for spectrally sensitizing each of the twelve areas, respectively, employing the solvent and concentrations for the sensitizing dye indicated:

as in the previous Examples 8–20. The resulting emulsion coating contains a plurality of areas, each of which does not build up additional developable density from the sequential exposures of the emulsion.

TABLE 5

| Example No. | Sensitizer | Solvent | Concentration, mg./liter |
|---|---|---|---|
| 8 | Anhydro-9-ethyl-3, 3'-dimethyl-4, 5; 4', 5'-dibenzothiacarbocyanine hydroxide, disulfonated | Water | 10 |
| 9 | Anhydro-5'-chloro-9-ethyl-3-methyl-3'-(3-sulfobutyl)-4, 5-benzothiacarbocyanine hydroxide, monosulfonated | do | 50 |
| 10 | 4-[4-(3-ethyl-2(3H)-benzoxazolylidene)-2-butenylidene]-3-methyl-1-p-sulfophenyl-2-pyrazolon-5-one, monosulfonated | do | 100 |
| 11 | 4-[(3-ethyl-2(3H)-benzoxazolylidene) ethylidene]-3-methyl-1-p-sulfophenyl-2-pyrazolin-5-one, monosulfonated | do | 40 |
| 12 | Anhydro-3, 3', 9-triethyl-5, 5'-di(p-sulfophenyl)-oxacarbocyanine hydroxide | do | 60 |
| 13 | Anhydro-3, 3'-di-(3-sulfobutyl)-9-methyl-triacarbocyanine hydroxide | do | 100 |
| 14 | Anhydro-5'-chloro-9-ethyl-3-methyl-3' carboxymethyl)-4, 5-benzothiacarbocyanine hydroxide, monosulfonated | do | 500 |
| 15 | Anhydro-3-ethyl-3'-beta-(4-sulfobutoxy) ethylthiacarbocyanine hydroxide | Methanol | 150 |
| 16 | Anhydro-1'-ethyl-3-beta- 3-sulfopropoxy) ethylthia-2'-cyanine hydroxide | Ethanol | 200 |
| 17 | Anhydro-1'-ethyl-3-beta-(sulfobutoxy) ethylthia-2'-cyanine hydroxide | do | 100 |
| 18 | 3-(2-diethylaminoethyl)-5-[(1-ethylnaphtho-[1, 2-d]-thiazolin-2-ylidene)-1- phenylethylidene]-rhodanine | Methanol | 150 |
| 19 | 3-(2-diethylaminoethyl)-5-(1-ethyl-4(1H)pyridylidene)-rhodanine | Water | 400 |

Next, the photo-element is developed in a developer having the following composition:

TABLE 6

Ingredient: Amount, grams
N-methyl-p-aminophenol _____ 3.1
Sodium sulfite, desiccated _____ 45.0
Hydroquinone _____ 12.0
Sodium carbonate, desiccated _____ 67.5
Potassium bromide _____ 1.9
Water to make 2.0 l.

The developed element is then fixed, washed and dried as before. Each of the twelve treated areas have recognizable differences in visible density, respectively. Thus, it is concluded that the spectrally sensitized areas respond to the exposure of that particular area, but after being desensitized, each area does not build up more developable density.

EXAMPLES 20–31

The procedure of Examples 8–19 is repeated employing a similar silver halide emulsion with the exception that a different desensitizer is employed for each area. The desensitizing agents that are employed are set forth below in Table 7:

TABLE 7

Example No.: Desensitizer
20 _____ 5-nitro-benzo-1,2,3-triazole.
21 _____ 2,3-dimethyl-6-nitrobenzo-thiazolium-p-toluene sulfonate.
22 _____ 2-phenylbenzo-1,2,3-triadiazolium bromide.
23 _____ N,N'-decamethylene-bis-(quinoxazolinium)perchlorate.
24 _____ Methylene blue chloride.
25 _____ 1-methyl-2-(p-nitrostyryl)-6-ethoxyquinolinium-p-toluenesulfonate.
26 _____ Pinakryptol green (chloride).
27 _____ 2-(p-diethylaminophenyliminomethyl)-1,6-dimethylquinolinium chloride.
28 _____ 2-(p-dimethylaminophenyliminomethyl)-3-ethylbenzothiazolium ethosulfate.
29 _____ Phenosafranine (chloride).
30 _____ 1,3-diamino-5-methylphenazinium chloride.
31 _____ 3-methyl-2-bis(phenylazo)methylene benzothiazoline.

The desensitizer is applied locally after each exposure with a felt pad. The particular desensitizer is employed in a predetermined concentration that results in the desensitized area of the emulsion having a sufficiently low sensitivity that even after the final sensitized area is exposed, recognizable differences in density between each sensitized area will result when the element is developed. The treated element is developed fixed, washed and dried

EXAMPLE 32

The procedure of Examples 20–31 is repeated, except that an evaporated silver halide layer coating rather than a silver halide emulsion layer is coated on the cellulose acetate support. This is accomplished in the following manner: An evaporated film is prepared by employing a standard vacuum coater (Consolidated Vacuum Corp. Model LC-18B), the interior metal parts of which are silver coated or made from materials to be evaporated are placed in boats made of thin metal strips through which an electric current is passed, heating the boats and their contents. The substrate upon which the vaporized materials are to be condensed is placed in the dome-shaped holder of the vacuum coater at some distance above the boats. Three ¼-gram pellets of silver bromide are placed in a silver boat 15 x 120 x .24 mm., and ½ gram of potassium bromide crystals is placed in a tungsten boat of the same size. The boats are clamped in the vacuum coater to separate electrodes above the base plate. A sheet of the cellulose acetate film base is attached to the domed holder at a distance of about 20 inches from the boats. A remotely operated shutter (silver coated) is placed over the boats between the substrate and the boats, and a glass monitor slide is placed between the samples of the substrate and in the same plane. The vacuum chamber is closed and evaporated to a pressure of $5 \times 10^{-5}$ torr. A potential is applied across the electrodes having the tgunsten boat causing a current of 275 amperes to flow, heating the boat and melting the potassium bromide. When the potassium bromide is completely molten, the shutter is opened and the potassium bromide vapor is allowed to condense on the substrate for a time sufficient to form a film approximately 8 nanometers (nm.) thick. The shutter is then closed and the molten potassium bromide allowed to solidify. The silver boat is heated next by an electric current of 370 amperes, and when the silver bromide becomes molten, the shutter is opened and a film of silver bromide 206 nanometers thick is allowed to form on the substrate over the potassium bromide film. The shutter is closed, the silver bromide melt covered, and air admitted to the vacuum chamber. The film thus obtained is overcoated with a 2% solution of inert gelatin containing 0.010 gram of formaldehyde per gram of gelatin. The solution is maintained at a temperature of 45° C. and the overcoated material is air dried at room temperature. The resulting non-spectrally sensitized silver halide is locally spectrally sensitized, exposed and desensitized as in Examples 20–31. Finally the element is developed, fixed and washed. As in the case of the preceding examples, the resulting negative has recognizable differences in density between the various locally-treated areas. Thus, the method of the present invention is suitable for treatment of evaporated silver halide layers as well as a silver halide emulsion layer.

EXAMPLE 33

A non-spectrally sensitized photographic element is made and described in Example 1. One area of the element corresponding in area to the output plane area of a bundle of optical fibers is spectrally sensitized as described in Example 1. The spectrally sensitized area of the photographic element is positioned over the output plane of the bundle of optical fibers and exposed to a light image of one letter of the alphabet fed into the input plane of the bundle of optical fibers. After sufficient exposure to create a good latent image the spectrally sensitized and exposed area of the photographic element is desensitized by applying the solution of pinakryptol green described in Example 1. Then the sequence described is repeated to produce a latent image of a second letter of the alphabet in a second area of the element, and so on until finally the photographic element contains latent images of each letter in the alphabet in different areas of the element. The composite exposure is then developed, washed, fixed, washed and dried as described in Example 1, leaving a composite mask image that is a negative of the input image. A positive mask is made from the negative mask by contact printing on a conventional photographic film and developed, fixed, washed and dried as described previously. The masks produced are used advantageously in fiber optic systems used for character recognition.

Similarly other photographic elements using other silver halide emulsions or evaporated silver halide, other spectral sensitizing agents and other desensitizing agents of our invention including those illustrated in Examples 1 through 32 are used advantageously to prepare masks as described in Example 33 for character recognition systems.

The invention has been described in considerable detail with particular reference to the preferred embodiments thereof, but it will be understood that variations and modifications may be effected within the spirit and scope of the invention as described hereinabove and as defined in the appended claims.

We claim:

1. A process comprising the steps:
   (1) spectrally sensitizing one area of a silver halide layer that is non-spectrally sensitized,
   (2) exposing the said spectrally sensitized area of the silver halide layer with a light image to produce a latent image,
   (3) desensitizing the said spectrally sensitized and exposed area of the silver halide layer by applying a chemical compound that is a desensitizing agent, and
   (4) photographically developing the said latent image to produce a corresponding visible image.

2. The process of claim 1 wherein said layer comprises silver halide in the form of an emulsion.

3. The process of claim 1 wherein the layer comprises an evaporated silver halide layer.

4. The process of claim 1 wherein at least one other area of the silver halide layer is spectrally sensitized, exposed, and desensitized in a sequential manner prior to development of the said layer.

5. A process comprising the steps:
   (1) spectrally sensitizing one area of a silver halide layer that is non-spectrally sensitized by the local application of a member selected from the group consisting of a water-soluble and a polar solvent-soluble spectral sensitizing dye,
   (2) exposing the said spectrally sensitized area of the silver halide layer with a light image to produce a latent image,
   (3) desensitizing the said spectrally sensitized and exposed area of the silver halide layer by applying a chemical compound that is a desensitizing agent, and
   (4) photographically developing the said latent image to produce a corresponding visible image.

6. The process of claim 5 wherein the spectral sensitizing dye contains solubilizing groups selected from the group consisting of a sulfo group, a sulfoalkyl group, a sulfoaryl group, a carboxy group, a carboxyalkyl group and an alkylaminoalkyl group.

7. The process of claim 5 wherein the spectral sensitizing dye is selected from those having the formula:

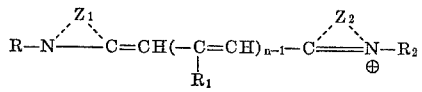

and the merocyanine dyes represented by the formula:

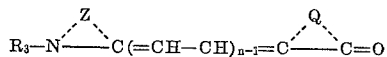

wherein R and $R_2$ each represent a lower alkyl group; $R_1$ represents a member selected from the class consisting of the hydrogen atom and a lower alkyl group; $R_3$ represents a lower alkyl group; Z, $Z_1$, and $Z_2$ each represent the nonmetallic atoms necessary to complete a 5 to 6 membered basic heterocyclic nucleus; such that Z has a group selected from the class consisting of sulfo and carboxy and such that at least one of the groups $Z_1$ and $Z_2$ has a group selected from the class consisting of sulfo and carboxy; Q represents the nonmetallic atoms necessary to complete a 4- to 6-membered ketomethylene cyclic nucleus; and $n$ is an integer of from 1 to 3.

8. The process of claim 5 wherein the spectral sensitizing dye is selected from those having the formula:

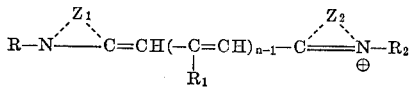

and the merocyanine dyes represented by the formula:

wherein R and $R_2$ represent a lower alkyl group; $R_1$ represents a member selected from the class consisting of the hydrogen atom and a lower alkyl group; $R_3$ represents a lower alkyl group; Z, $Z_1$ and $Z_2$ each represent the nonmetallic atoms necessary to complete a 5 to 6 membered basic heterocyclic nucleus selected from the class consisting of a thiazole, a benzothiazole, a naphthothiazole, a thionaphtheno-7',6',4,5-thiazole, an oxazole, a benzoxazole, a naphthoxazole, a selenazole, a benzoselenazole, a naphthoselenazole, a thiazoline, a 2-pyridine, a 4-pyridine, a 2-quinoline, a 4-quinoline, a 1-isoquinoline, a 3-isoquinoline, a 3,3-dialkylindolenine, an imidazole, a benzimidazole, and a naphthimidazole, such that Z has a group selected from the class consisting of sulfo and carboxy and such that at least one of $Z_1$ and $Z_2$ has a group selected from the class consisting of sulfo and carboxy; Q represents the nonmetallic atoms necessary to complete a 4- to 6-membered ketomethylene heterocyclic nucleus selected from the class consisting of a 3-thietanone-1,1-dioxide, a rhodanine, a 2-thiobarbituric acid, a barbituric acid, a 2-thiohydantoin, a 2-hydantoin, a 2-thio-2,4-oxazolidinedione, a 2-thiazolin-4-one, a 2-pyrazolin-5-one, a 2-imidazolin-4-one, a 2-imidazolin-4-thione, a 2-imidazolin-4-selenone, a 1,3-cyclopentanedione, and a 1,3-cyclohexanedione; and $n$ is an integer of from 1 to 3.

9. The process of claim 5 wherein the spectral sensitizing dye is anhydro-3,3'-di-sulfobutyl-9-methyl-thiacarbocyanine hydroxide.

10. The process of claim 1 wherein the spectrally sensitized portion of the layer is desensitized after exposure by applying thereto a desensitizing agent selected from the group consisting of a mercury salt, a rhodium salt, an anthraquinone dye containing a sulfoalkylaminosulfone radical, a non-heterocycylic aromatic compound containing at least one nitro radical, and a heterocyclic compound containing at least one hetero atom selected from the group consisting of a sulfur atom and a nitrogen atom.

11. The process of claim 1 wherein the desensitizing agent is selected from the group consisting of mercuric chloride,
triammonium hexachlororhodite,
3,5-dinitrobenzhydrazide,
5-nitrobenzo-1,2,3-triazole,
4-nitro-6-chlorobenzotriazole,
2,3-dimethyl-6-nitrobenzothiazolium-p-toluenesulfonate,
2-phenylbenzo-1,2,3-thiadiazolium bromide,
N,N'-decamethylene-bis-(quinoxalinium) perchlorate,
Methylene blue chloride,
1-methyl-2-(p-nitrostyryl)-6-ethoxyquinolinium-p-toluene sulfonate,
2-(p-diethylaminophenyliminomethyl)-1,6-dimethylquinolinium chloride,
2-(p-dimethylaminophenyliminomethyl)-3-ethylbenzothiazolium ethosulfate,
phenosafranine chloride,
Pinakryptol green chloride,
1,3-diamino-5-methylphenazinium chloride,
3-methyl-2-bis(phenylazo)methylene benzothiazoline, and
anthraquinone-2-sulphotauride.

12. The process of claim 1 wherein the desensitizing agent is Pinakryptol green chloride.

13. A process for producing a mask containing a plurality of images for a character recognition system using a bundle of light-conducting optical fibers having an input end and an output end, the said images corresponding to the characters to be recognized, said process comprising the steps:
(1) spectrally sensitizing one area of a silver halide layer that is non-spectrally sensitized,
(2) exposing the said spectrally sensitized area of the silver halide layer with a light image from the said output plane to produce a latent image, said light image corresponding to a light image from a character at the said input plane,
(3) desensitizing the said spectrally sensitized and exposed area of the silver halide layer by applying a chemical compound that is a desensitizing agent,
(4) repeating steps 1, 2, and 3 on a different area of the said silver halide layer to produce a latent image corresponding to another of said characters, until a latent image has been produced corresponding to each character to be recognized, and
(5) photographically developing the said latent image to produce the corresponding visible images.

14. A process comprising the steps:
(1) spectrally sensitizing one area of a silver halide layer that is non-spectrally sensitized by the local application of a solution of a spectral sensitizing dye selected from those having the formula:

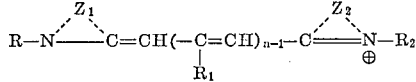

and the merocyanine dyes represented by the formula:

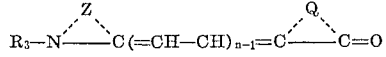

wherein R and $R_2$ each represent a lower alkyl group; $R_1$ represents a member selected from the class consisting of the hydrogen atom and a lower alkyl group; $R_3$ represents a lower alkyl group; Z, $Z_1$, and $Z_2$ each represent the nonmetallic atoms necessary to complete a 5 to 6 membered basic heterocyclic nucleus; such that Z has a group selected from the class consisting of sulfo and carboxy and such that at least one of the groups $Z_1$ and $Z_2$ has a group selected from the class consisting of sulfo and carboxy; Q represents the nonmetallic atoms necessary to complete a 4- to 6-membered ketomethylene cyclic nucleus; and $n$ is an integer of from 1 to 3, (2) exposing the said spectrally sensitized area of the silver halide layer with a light image to produce a latent image,
(3) desensitizing the said spectrally sensitized and exposed area of the said silver halide layer by applying thereto a desensitizing agent selected from the group consisting of a mercury salt, a rhodium salt, an anthraquinone dye containing a sulfoalkylaminosulfone radical, a non-heterocyclic aromatic compound containing at least one nitro radical, and a heterocyclic compound containing at least one hetero atom selected from the group consisting of a sulfur atom and a nitrogen atom,
(4) repeating steps (1), (2) and (3) at least once to other areas of said silver halide layer, and
(5) photographically developing the latent images produced thereby to corresponding visible images.

References Cited
UNITED STATES PATENTS
3,250,618  5/1966  Stewart, et al. -------- 96—65

NORMAN G. TORCHIN, Primary Examiner
A. T. SURO PICO, Assistant Examiner

U.S. Cl. X.R.
96—41